United States Patent
Hoyer et al.

(10) Patent No.: US 10,560,436 B2
(45) Date of Patent: Feb. 11, 2020

(54) PSEUDONYMOUS PROXIMITY LOCATION DEVICE

(71) Applicant: ASSA ABLOY AB, Stockholm (SE)

(72) Inventors: Philip Hoyer, Richmond (GB); Mark Robinton, Eden Prairie, MN (US)

(73) Assignee: ASSA ABLOY, AB, Stockholm (SE)

(*) Notice: Subject to any disclaimer, the term of this patent is extended or adjusted under 35 U.S.C. 154(b) by 0 days.

(21) Appl. No.: 15/522,332

(22) PCT Filed: Nov. 2, 2015

(86) PCT No.: PCT/IB2015/002453
§ 371 (c)(1),
(2) Date: Apr. 27, 2017

(87) PCT Pub. No.: WO2016/067113
PCT Pub. Date: May 6, 2016

(65) Prior Publication Data
US 2017/0339112 A1    Nov. 23, 2017

Related U.S. Application Data

(60) Provisional application No. 62/073,816, filed on Oct. 31, 2014.

(51) Int. Cl.
*H04L 12/24* (2006.01)
*H04L 29/06* (2006.01)
(Continued)

(52) U.S. Cl.
CPC ......... *H04L 63/0407* (2013.01); *H04W 4/023* (2013.01); *H04W 4/029* (2018.02)

(58) Field of Classification Search
CPC .............................. H04L 63/0407; H04W 4/04
(Continued)

(56) References Cited

U.S. PATENT DOCUMENTS 10,149,159 B1 * 12/2018 Perfitt ................... H04W 12/06
2007/0260884 A1 * 11/2007 Venkitaraman ..... H04L 29/1232
713/169
(Continued)

FOREIGN PATENT DOCUMENTS

EP        1871135      12/2007
EP        1871135 A2 * 12/2007 ............ H04W 12/02
(Continued)

OTHER PUBLICATIONS

International Search Report and Written Opinion for International (PCT) Patent Application No. PCT/IB2015/002453 dated Mar. 31, 2016, 10 pages.

(Continued)

*Primary Examiner* — Moustafa M Meky
*Assistant Examiner* — Elizabeth Kassa
(74) *Attorney, Agent, or Firm* — Schwegman Lundberg & Woessner, P.A.

(57) ABSTRACT

A pseudonymous proximity location device and methods of operating and/or interacting with the same are provided. The pseudonymous proximity location device is configured to provide meaningful information to authorized reading devices but useless information to non-authorized reading devices, thereby prohibiting the use of the pseudonymous proximity location device by unauthorized reading devices.

13 Claims, 6 Drawing Sheets

(51) Int. Cl.
  *H04W 4/02* (2018.01)
  *H04W 4/029* (2018.01)
(58) Field of Classification Search
  USPC .......................................................... 709/227
  See application file for complete search history.

(56) References Cited

U.S. PATENT DOCUMENTS

| | | | | |
|---|---|---|---|---|
| 2012/0268244 | A1* | 10/2012 | Ljung | H04W 4/028 340/5.65 |
| 2013/0318167 | A1* | 11/2013 | Sereboff | G06F 17/30861 709/204 |
| 2015/0103776 | A1* | 4/2015 | Luther | H04L 61/2038 370/329 |
| 2015/0281878 | A1* | 10/2015 | Roundtree | H04W 4/80 455/41.2 |
| 2016/0127341 | A1* | 5/2016 | Yan | H04L 63/08 726/9 |
| 2017/0070847 | A1* | 3/2017 | Altman | H04H 60/90 |
| 2018/0198714 | A1* | 7/2018 | Krieger | H04W 4/80 |

FOREIGN PATENT DOCUMENTS

| | | |
|---|---|---|
| EP | 3213485 A1 | 9/2017 |
| WO | WO-2016067113 A1 | 5/2016 |

OTHER PUBLICATIONS

International Preliminary Report on Patentability for International (PCT) Patent Application No. PCT/IB2015/002453 dated May 11, 2017, 7 pages.

"European Application Serial No. 15825949.9, Communication Pursuant to Article 94(3) EPC dated Aug. 13, 2018", 5 pgs.

"European Application Serial No. 15825949.9, Response filed Feb. 22, 2019 to Communication Pursuant to Article 94(3) EPC dated Aug. 13, 2018", 25 pgs.

"International Application Serial No. PCT/IB2015/002453, International Preliminary Report on Patentability dated May 11, 2017", 7 pgs.

"International Application Serial No. PCT/IB2015/002453, International Search Report dated Mar. 31, 2016", 3 pgs.

"International Application Serial No. PCT/IB2015/002453, Written Opinion dated Mar. 31, 2016", 5 pgs.

\* cited by examiner

PSEUDONYMOUS PROXIMITY LOCATION DEVICE

CROSS REFERENCE TO RELATED APPLICATIONS

This application is a national stage application under 35 U.S.C. 371 of PCT Application No. PCT/IB2015/002453, having an international filing date of Nov. 2, 2015, which designated the United States, which PCT application claimed the benefit of priority under 35 U.S.C. 119(e) to U.S. Provisional Patent Application No. 62/073,816, filed Oct. 31, 2014. The entire disclosures of each, PCT Application No. PCT/IB2015/002453 and U.S. Provisional Patent Application No. 62/073,816, are incorporated herein by reference in their entirety.

FIELD OF THE DISCLOSURE

The present disclosure is generally directed to location devices and, in particular, toward mechanisms for obtaining pseudonymous proximity location information.

BACKGROUND

There is a new generation of proximity devices emerging that allow an application on a mobile device to interact with the proximity device to determine that the mobile device and a specific application running on the mobile device is at a specific physical location. These types of proximity devices are referred to as a Proximity Location Device (PLD). Near-Field Communication (NFC) tags and Bluetooth Low Energy (BLE) beacons are examples of devices that can be utilizes as a PLD.

A BLE beacon broadcasts a model identifier—usually in the form of a Universally-Unique Identifier (UUID)—having a Major.minor identifier. The application on the mobile device is registered against the UUID and is automatically awoken when it receives the broadcast request and can then determine the user experience by using the Major.minor identifier. Often the Major represents the location (e.g. supermarket in downtown Washington) and the minor a specific sub-location (e.g. electronics section/aisle).

Service Providers are currently investing money to install a network of beacons. Once installed, the beacons are connected to a service platform which allows the Service Provider to offer location-based services to users (e.g., a location-based service can be offered to the supermarket).

A problem encountered by some Service Providers is that the broadcast information of the beacon is freely available and readable to anyone that is in the vicinity of the beacon. In fact, 'Beacon maps' are being developed and deployed that link physical location coordinates and Beacon identifiers. These 'Beacon maps' are being published on the Internet and other uncontrolled and untrusted outlets.

The uncontrolled distribution of 'Beacon maps' allow other Service Providers to create a service platform that effectively piggy-backs on beacons deployed by other Service Providers for free. With the threat of having their deployed PLDs hijacked, some Service Providers are hesitant to invest in installing a large base of PLDs.

SUMMARY

It is, therefore, one aspect of the present disclosure to create a pseudonymous PLD with the following characteristics:

1. The PLD should still use the existing Beacon/NFC standards for communication without breaking the current interaction with the reading mobile device and application.

2. The PLD should be able to avoid sharing its UUID or similar identifier/location information with a casual/not authorized application, thereby preventing the unauthorized creation of 'Beacon maps'. It would be particularly useful if the information shared by the PLD caused the PLD to remain anonymous.

3. The PLD should allow an authorized application to retrieve the real identity of the PLD to then be able to retrieve the location of the PLD/mobile device/application, thereby driving the location-based user experience. In particular, it would be useful for the application to retrieve the real location identifier without requiring the application to connect to a cloud service.

These and other objects of the present disclosure can be achieved by using a pseudonymous PLD in the following manner (for example):

With respect to anonymity, one or a combination of the following may be implemented by the PLD:

1. The PLD can send the same identifier (e.g. Major.minor identifier) as all the other proximity devices.

2. The PLD may send a randomized identifier (e.g. Major.minor identifier) for each broadcast.

3. The PLD will send a pseudo-random identifier: random nonce+encrypted (nonce+real identifier)

This effectively means that a non-authorized mobile reading device will either get the same identifier from all PLDs, regardless of location or the non-authorized mobile reading device will get a random identifier that is useless to the non-authorized mobile reading device. Both of these scenarios effectively render the identifier from the PLD useless to the non-authorized mobile reading device because the non-authorized mobile reading device will not be able to identify the specific proximity device or its specific location.

With respect to authorized applications retrieving the real identifier, the application can leverage a component that allows the application (or the authorized mobile reading device) to retrieve the real identity of the PLD by one or more of:

1. In-application calling of the PLD identity component and retrieving the real identity of the PLD.

2. In-application calling of the PLD identity component that re-connects to the PLD to retrieve the identity of the PLD.

3. The application can call a cloud service to retrieve the identity of the PLD.

The present disclosure will be further understood from the drawings and the following detailed description. Although this description sets forth specific details, it is understood that certain embodiments of the invention may be practiced without these specific details.

DETAILED DESCRIPTION

Figure 1:
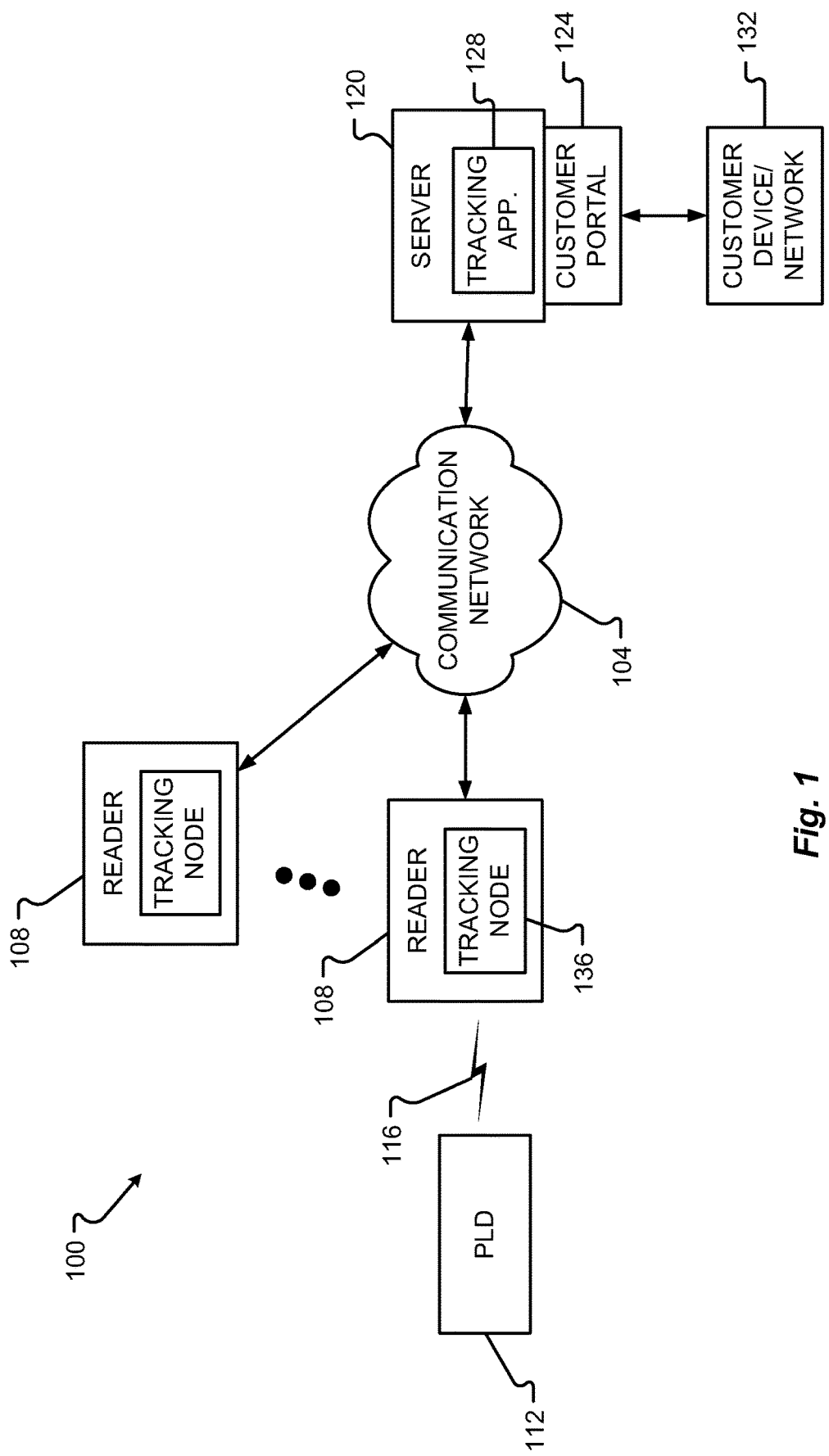
FIG. 1 depicts a block diagram of a communication system in accordance with at least some embodiments of the present disclosure.

With reference initially to FIG. 1, a communication system 100 in which location tracking of PLDs 112 is made possible will be described in accordance with at least some embodiments of the present disclosure. The communication system 100 is shown to include a communication network 104 that provides communication capabilities between a plurality of readers or reading devices 108, and a server 120. Other communication components may also be connected to the communication network 104 without departing from the scope of the present disclosure.

The communication network 104 may include any type of communication medium or collection of communication equipment that enables remote communication devices to exchange information and/or media with one another using any type of known or yet-to-be developed transport protocol. The communication network 104 may facilitate wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network (e.g., 3G, 4G, LTE, etc.), and any other type of packet-switched or circuit-switched network known in the art. In addition, it can be appreciated that the communication network 104 need not be limited to any one network type, and instead may be comprised of a number of different networks and/or network types. Moreover, the communication network 104 may comprise a number of different communication mediums such as coaxial cable, copper cable/wire, fiber-optic cable, antennas for transmitting/receiving wireless messages, and combinations thereof.

The reader 108 may correspond to a portable or stationary unit or device capable of reading data from one or more PLDs 112 via a communication channel 116. The reader 108, in some embodiments, corresponds to a wall-mounted reader. In some embodiments, the reader 108 corresponds to a portable reading device. In some embodiments, the reader 108 corresponds to a mobile communication device that is capable of reading data from a PLD 112. In some embodiments, different types of readers 108 may be connected to the communication network 104 and each of the readers 108 may be provided with one or more tracking nodes 136 that enables the server 120 to obtain location or tracking information for the PLDs 112 that interact with a reader 108 via the communication channel 116. In this way, the tracking node 136 of each reader 108 is utilized to obtain certain location and/or identity information from the PLD 112 and forward the information along to the server 120. Upon receiving the location and/or identity information from a tracking node 136, the server 120 may employ a tracking application 128 to collect and organize the information obtained from the plurality of tracking nodes 136. This collected and organized location and identification information can then be delivered to a customer device or network 132 via a customer portal 124. Thus, the tracking application 128 working in connection with the tracking nodes 136 is able to create a complete and substantially real-time depiction of location information for PLDs 112 that interact with readers 108.

The PLDs 112 may correspond to any type of device capable of interaction with a reader 108 and communicating some form of identification information to the reader 108. Non-limiting examples of PLDs 112 include Near-Field Communication (NFC) tags and Bluetooth Low Energy (BLE) beacons. Any other device capable of physical movement, establishment of the communication channel 116, and delivery of some form of data to the reader 108 may also be considered a PLD 112. In some scenarios the PLD 112 may include a microprocessor and antenna capable of establishing the communication channel 116. Operation of the antenna and messages delivered thereby may be controlled by the microprocessor of the PLD 112.

The communication channel 116 may correspond to any contact-based or contactless communication link between the reader 108 and PLD 112. A contactless communication channel 116 may include one or more of a WiFi channel (e.g., establishing according to 802.11N communication standards), a Bluetooth channel, an NFC channel (e.g., an inductive coupling between the antenna of the PLD 112 and an antenna in the reader 108). Generally speaking, the contactless communication channel may correspond to a proximity-based communication channel that is only established when the PLD 112 and reader 108 are within a predetermined distance of one another. Contact-based communication channels 116 may include, without limitation, a contact-based smart chip connection, USB port connections, Ethernet connections, etc.

The server 120 may correspond to any type of known server or collection of servers (e.g., server farm, server cluster, etc.) capable of communicating over the communication network 104 and communicating with the customer/device network 132. The customer portal 124 used to expose location information obtained via execution of the tracking application 128 may, in some embodiments, correspond to an Application Programming Interface (API) or Graphical User Interface (GUI) exposed to the customer device/network 132 as a website, webportal, HTML document, XML document, etc. The interface between the server 120 and customer/device network 132 may be customer-specific or generic among a plurality of customers that are served by the server 120. Thus, although FIG. 1 only shows the server 120 being in communication with a single customer device/network 132, it should be appreciated that the server 120 may provide location information for PLDs 112 to a plurality of different customer devices and/or networks 132 and such information may be exposed to the different customer's via a different customer portal 124 or via a common customer portal 124.

In some embodiments, the server 120 utilizes the tracking application 128 to develop one or more tracking reports that can be delivered to the customer device/network 132 via the customer portal 124. In some embodiments, the tracking report generated by the tracking application 128 may encapsulate tracking data (e.g., data broadcast by PLD 112 over communication channel 116 and received at the tracking node 136) with other metadata about each event and tracking node 136 itself. In some embodiments, the reports allow flexible grouping of data from multiple events as well as mixing data coming from different sources (e.g. genuine or verified PLDs 112 as well as generic or non-genuine PLDs 112). The report may also be flexible in that it is not required to fix the actual coding of the tracking report and key for grouping of individual events because it will depend on many factors, mainly capabilities of transport network between tracking nodes 132 and backend tracking application 128. In some embodiments, an ASN.1 scheme can be used in which each object is described, thereby allowing almost limitless structuring but for restricted networks with small throughput. In other embodiments, it may be possible to achieve a more efficient packet implementation with static structure and fixed fields' lengths. As a non-limiting example, the report generated by the tracking application 128 may include a report header that includes data such as a data structure version identifier, a tracking node identifier, and a report generation sequence number (e.g., timestamp or simple counter). The report may further include report data that includes event information (e.g., a description of event type, event data specific for a given type, a measured strength of the event, event time, etc.). The event type may include a description of whether the tracking node 136 received information from a genuine/authentic PLD 112 or a generic PLD. The event data specific for a given type may include a payload of the packets received at the tracking node 136 (e.g., Bluetooth smart packet payload, MAC address of the PLD 112, etc.). The measured strength of the event may include an RSSI value for the communication channel 116, an angle of arrival information (for further refinement to the location determination), time of flight information, etc.). The event time may include both an event timestamp measured at the PLD 112 and/or at the tracking node 136. The report may include data for up to N events where N is an integer value greater than or equal to one.

As will be discussed in further detail herein, it may be desirable to employ an anonymization mechanism to protect data in the PLDs 112, the readers 108, and holders thereof. The anonymization mechanism may be based on a notion that each broadcast from a particular PLD 112 should be different and there should be no discernible or visible pattern which could link any two or more different broadcasts to one another (e.g., they broadcasts look completely random). This ultimately may require randomization of the PLD's 112 MAC address which is used in certain packet types communicated to the reader 108. As a more specific, but non-limiting, example the PLDs 112 may correspond to Bluetooth-enabled devices and there may be a randomization of Bluetooth Smart Advertising Addresses by the PLDs 112, which are used in ADV_IND packets. It should be appreciated, however, that other types of PLDs 112 may be employed and different addresses or identification information for those PLDs 112 may be randomized or partially randomized to preserve a particular amount of anonymity.

Figure 2:
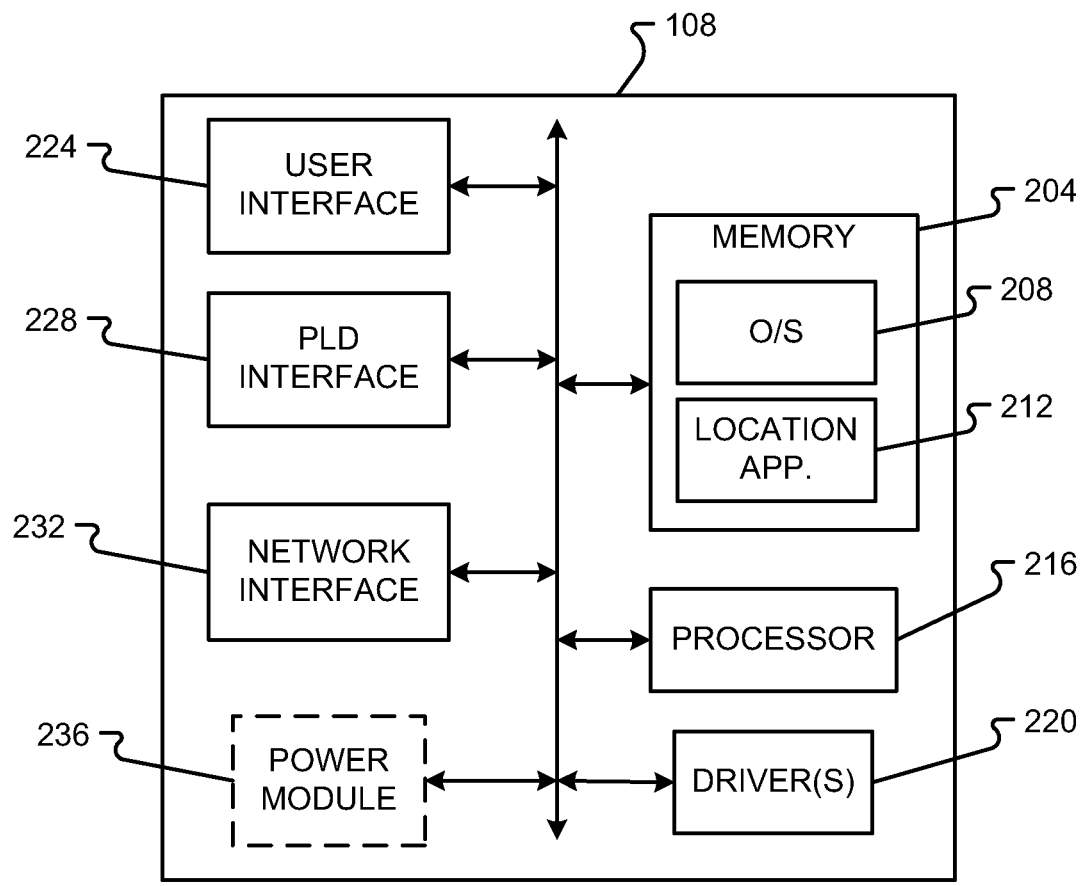
FIG. 2 is a block diagram depicting details of a reader in accordance with at least some embodiments of the present disclosure.

With reference to FIG. 2, additional details of a reader 108 will be described in accordance with at least some embodiments of the present disclosure. The reader 108 is shown to include computer memory 204 that stores one or more Operating Systems (O/S) 208 and a location application 212, among other items. The reader 108 is also shown to include a processor 216, one or more drivers 220, a user interface 224, a credential interface 228, a network interface 232, and a power module 236.

The memory 204 may correspond to any type of non-transitory computer-readable medium. In some embodiments, the memory 204 may comprise volatile or non-volatile memory and a controller for the same. Non-limiting examples of memory 204 that may be utilized in the reader 108 include RAM, ROM, buffer memory, flash memory, solid-state memory, or variants thereof. Any of these memory types may be considered non-transitory computer memory devices even though the data stored thereby can be changed one or more times.

The O/S 208 may correspond to one or multiple operating systems. The nature of the O/S 208 may depend upon the hardware of the reader 108 and the form factor of the reader 108. The O/S 208 may be viewed as an application stored in memory 204 that is processor-executable. The O/S 208 is a particular type of general-purpose application that enables other applications stored in memory 204 (e.g., the location application 212) to leverage the various hardware components and driver(s) 220 of the reader 108. In some embodiments, the O/S 208 may comprise one or more APIs that facilitate an application's interaction with certain hardware components of the reader 108. Furthermore, the O/S 208 may provide a mechanism for viewing and accessing the various applications stored in memory 208 and other data stored in memory 208.

The location application 212 may correspond to one example or a portion of a tracking node 136 as shown in FIG. 1. In particular, a location application 212 may correspond to a portion of instructions stored in memory 204 that enables the reader 108 to execute the functions of the tracking node 136 as discussed herein. Even more specifically, the location application 212 (or tracking node 136) can utilize a real identity of a PLD 112 (as received via a communication channel 116) in connection with providing one or more services to a user of the reader 108. The application 212, in some embodiments, may accesses a Proximity Location Device (PLD) Identity Component (PIC) to determine the real identity based on a pseudo anonymous response received from the PLD 112, where the pseudo anonymous response does not expose the real identity to applications which do not have access to the PIC.

The processor 216 may correspond to one or many microprocessors that are contained within the housing of the reader 108 with the memory 204. In some embodiments, the processor 216 incorporates the functions of the user device's 108 Central Processing Unit (CPU) on a single Integrated Circuit (IC) or a few IC chips. The processor 216 may be a multipurpose, programmable device that accepts digital data as input, processes the digital data according to instructions stored in its internal memory, and provides results as output. The processor 216 implement sequential digital logic as it has internal memory. As with most known microprocessors, the processor 216 may operate on numbers and symbols represented in the binary numeral system.

The driver(s) 220 may correspond to hardware, software, and/or controllers that provide specific instructions to hardware components of the reader 108, thereby facilitating their operation. For instance, the user interface 224, credential interface 228, and network interface 232, may each have a dedicated driver 220 that provides appropriate control signals to effect their operation. The driver(s) 220 may also comprise the software or logic circuits that ensure the various hardware components are controlled appropriately and in accordance with desired protocols. For instance, the driver 220 of the credential interface 228 may be adapted to ensure that the credential interface 228 follows the appropriate proximity-based protocols (e.g., BLE, NFC, Infrared, Ultrasonic, IEEE 802.11N, etc.) such that the credential interface 228 can exchange communications with the credential 112. Likewise, the driver 220 of the network interface 232 may be adapted to ensure that the network interface 232 follows the appropriate network communication protocols (e.g., TCP/IP (at one or more layers in the OSI model), UDP, RTP, GSM, LTE, Wi-Fi, etc.) such that the network interface 232 can exchange communications via the communication network 104. As can be appreciated, the driver(s) 220 may also be configured to control wired hardware components (e.g., a USB driver, an Ethernet driver, etc.).

As mentioned above, the user interface 224 may comprise one or more user input devices and/or one or more user output devices. Examples of suitable user input devices that may be included in the user interface 224 include, without limitation, buttons, keyboards, mouse, pen, camera, microphone, etc. Examples of suitable user output devices that may be included in the user interface 224 include, without limitation, display screens, lights, speakers, etc. It should be appreciated that the user interface 224 may also include a combined user input and user output device, such as a touch-sensitive display or the like.

The credential interface 228 may correspond to the hardware that facilitates communications with the credential 112 for the reader 108. The credential interface 228 may include a Bluetooth interface (e.g., antenna and associated circuitry), a Wi-Fi/802.11N interface (e.g., an antenna and associated circuitry), an NFC interface (e.g., an antenna and associated circuitry), an Infrared interface (e.g., LED, photodiode, and associated circuitry), and/or an Ultrasonic interface (e.g., speaker, microphone, and associated circuitry). In some embodiments, the credential interface 228 is specifically provided to facilitate proximity-based communications with a credential 112 via communication channel 116 or multiple communication channels 116.

The network interface 232 may comprise hardware that facilitates communications with other communication devices over the communication network 104. As mentioned above, the network interface 232 may include an Ethernet port, a Wi-Fi card, a Network Interface Card (NIC), a cellular interface (e.g., antenna, filters, and associated circuitry), or the like. The network interface 232 may be configured to facilitate a connection between the reader 108 and the communication network 104 and may further be configured to encode and decode communications (e.g., packets) according to a protocol utilized by the communication network 104.

The power module 236 may include a built-in power supply (e.g., battery) and/or a power converter that facilitates the conversion of externally-supplied AC power into DC power that is used to power the various components of the reader 108. In some embodiments, the power module 236 may also include some implementation of surge protection circuitry to protect the components of the reader 108 from power surges.

Figure 3A:
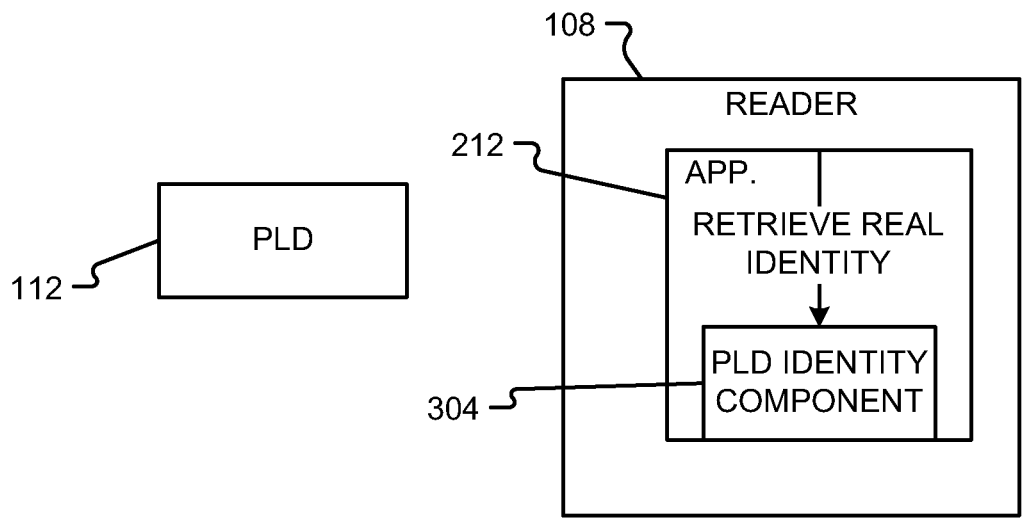
FIG. 3A is a flow diagram depicting a first identity retrieval scenario in accordance with at least some embodiments of the present disclosure.
Figure 3B:
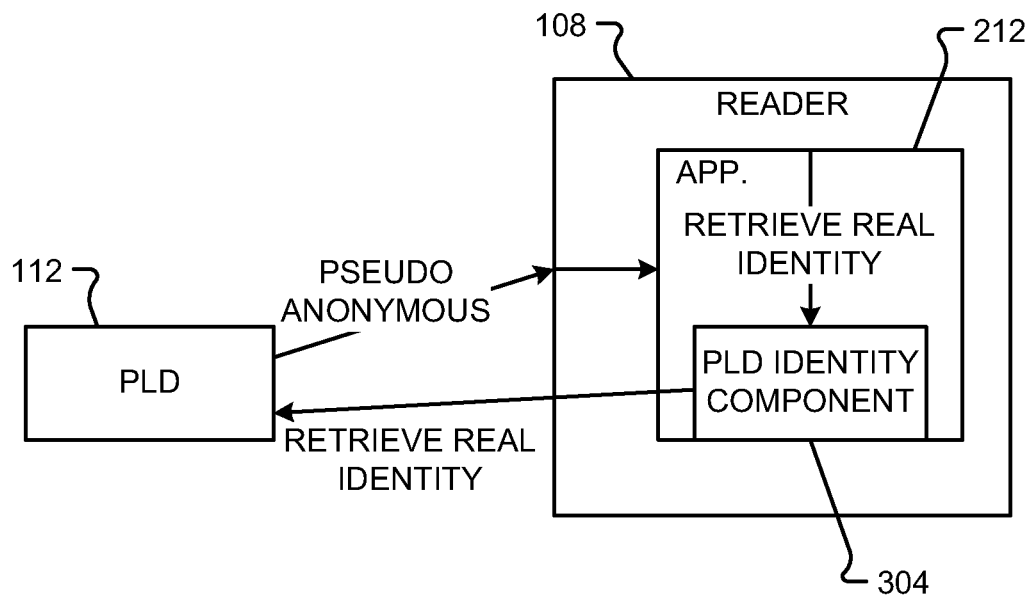
FIG. 3B is a flow diagram depicting a second identity retrieval scenario in accordance with at least some embodiments of the present disclosure.
Figure 3C:
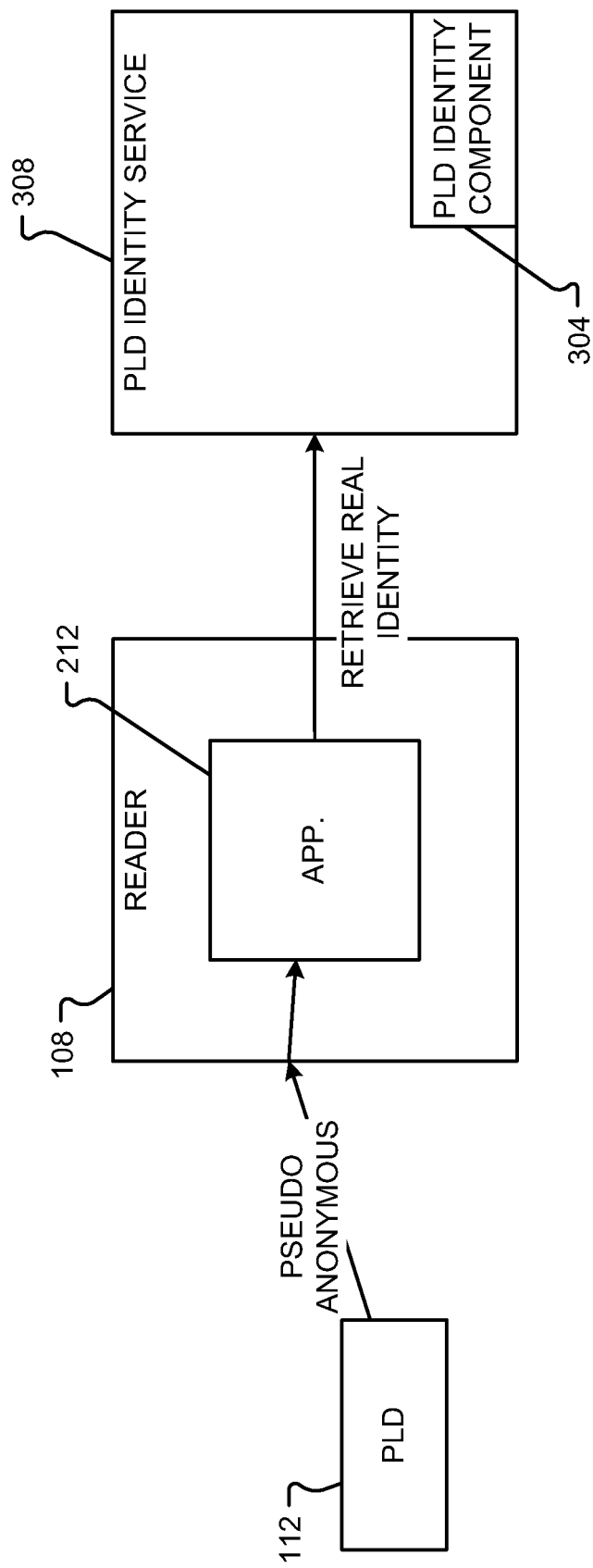
FIG. 3C is a flow diagram depicting a third identity retrieval scenario in accordance with at least some embodiments of the present disclosure.

With reference now to FIGS. 3A-C, various different identity retrieval scenarios will be described in accordance with at least some embodiments of the present disclosure. The various scenarios are not intended to limit the scope of the present disclosure, but rather are meant to show different modifications to the reader 108 and/or server 120 that can be made to carry out the pseudo anonymous location tracking functions described herein. Any combination of scenarios can be utilized, including those combinations neither depicted nor described herein.

With reference initially to FIG. 3A, a first identity-retrieval scenario is depicted. In this first scenario, the application 212 may perform an in-application calling of a PLD Identity Component (PIC) 304 to retrieve/determine the actual identity of a read PLD 112 (e.g., real Identity (I)). In particular, the application includes a PIC 304 (e.g., in the form of a software library) that contains a function to retrieve the real PLD identity (I). In some embodiments, the PIC 304 could compute the real PLD identity (I) cryptographically.

One example of how the PIC 304 could compute the real PLD identity (I) of the PLD 112 cryptographically is as follows:

PLD 112 contains a symmetric secret key (S) with which to compute an encrypted real identity (enc(I))

The PLD 112 creates a random nonce (N) to create a response (R) using the symmetric key (S) according to the following—R=N|enc(S,I|N) (where the character '|' means appending, concatenating, combining, XOR-ing, or the like)

The PLD 112 broadcasts the response (R) via the communication channel 116

The application 212 on the reader 108 receives the response (R) and calls the PIC 304 with the response (R)

The PIC 304 decrypts the encrypted real identity (enc(I)) using the random nonce (N) and the secret key (S), which is stored locally within the application 212 or within a secure element made available to the application 212, thereby resulting in a determination of the real Identity (I)

In another example, and as shown in FIG. 3B, the application 212 may perform an in-application calling of the PIC 304 and the actual identity of the read PLD (e.g., real Identity (I)) may be obtained by reconnecting to the PLD 112. In some embodiments, the application 212 will have an embedded PIC 304 (e.g., a software library) that contains a function to retrieve the real Identity (I). The PIC 304 can be configured to compute the real Identity (I) cryptographically or it could be configured to reconnect to the PLD 112 to retrieve the real Identity (I).

One example of how the PIC 304 could obtain the real PLD identity (I) by reconnecting with the PLD 112 is as follows:

The PLD 112 contains a clock and a secret key (S) which is used to compute a One-Time Password based on time such as TOTP (as described in RFC 6238, the entire contents of which are hereby incorporated herein by reference).

The PLD 112 broadcast action triggers the creation of a nonce (N) that is stored with a predetermined number (e.g., 20) of the last nonce values created and broadcast by the PLD 112. The PLD 112 then broadcasts the recently-created nonce (N) in the Major.minor. This identifier is received at the application 212, which passes the nonce (N) to the PIC 304.

The PIC 304 uses the nonce (N) and the time (T) to create a response (R) using the same symmetric key (S) (which may be stored locally). In some embodiments, the response (R) may be computed with a hashing function or cryptographic algorithm, such as the SHA-1 hashing algorithm. Specifically, the response (R) may be calculated according to the following: R=HMAC-SHA1(S,T|N). The application 212 then reconnects with the PLD 112 and passes the response (R) to the PLD 112 (e.g., via the communication channel 116 again).

The PLD 112 checks that the response (R) corresponds to a valid a value using the time and each of the last set of nonce values generated thereby (e.g., the last 20 nonce values) as maintained in its local memory. If there is a match between the nonce in the response (R) and any of the nonce values stored in local memory of the PLD 112, the PLD 112 will then send back to the PIC 304 the real identity (I) encrypted with the nonce (N) that was just sent to the reader 108 and the secret key (S) (e.g., enc(I)=enc(S,N|I)).

The PIC 304 decrypts the encrypted real identity (enc(I)) using the nonce (N) and the secret key (S) to obtain the real identity (I) in an unencrypted form.

In another example, and as shown in FIG. 3C, a temporary PLD access token may be utilized to secure the real identity (I). Specifically, in a scenario similar to the PLD reconnection scenario described above, a service 308 is used to retrieve an access ticket that can be presented to the PLD 112 to retrieve the identity instead of storing a secret key locally at the application 212.

An example of how such an access token could be used is as follows:

The PIC 304 retrieves an access ticket signed with the secret key from a ticket 308 service (secret(Service)).

PLD 112 contains a clock and public key (pub(Service)) of the access ticket service 308 that it trusts.

The PLD 112 broadcast action triggers the creation of a nonce (N) that is stored with last X (e.g., 20) nonce values previously created by the PLD. The newly-created nonce (N) is broadcast in the Major.minor.

The application 212 receives the broadcast and passes the nonce (N) to the PIC 304 (this communication may occur via the communication network 104 and may or may not be encrypted).

The PIC 304 reconnects to the PLD 112 and provides the nonce (N) as well as the access ticket (secret(Service)) to the PLD 112.

The PLD 112 checks that the nonce (N) was of the last X nonce values and that the access ticket is valid (including potentially analyzing an expiration time of the access ticket by comparing the public key (pub(Service)) with the access ticket (secret(Service))).

If the nonce (N) was found in the last X nonce values and the access ticket is valid, the PLD 112 will send the real identity (I) encrypted with (N) (enc(I)) back to the PIC 304 (via a conduit established via the reader 108).

The PIC 304 decrypts the encrypted real identity (enc(I)) using the nonce (N) to obtain the real identity (I).

It should be appreciated that other protection mechanisms to protect the real identity (I) in the response to the PIC 304 can be envisaged such as the creation of an ephemeral public/private keypair and the PIC 304 passing the public key to the PLD 112 in the request (R) and the PLD 112 encrypting the real identity (I) with the public part of the ephemeral keypair.

In yet another example, a service-based identity retrieval mechanism can be utilized whereby the application 212 can call a cloud service to retrieve the identity of the PLD 112. Specifically, the PLD 112 may broadcast a nonce (N) and an encrypted identifier (R=N|enc(S,I|N)). The encryption will occur using a symmetric key with small block cypher length and the same key is stored securely in the PIC 308 (where the PIC is maintained in the cloud-based service).

Employing any of the mechanisms described above, the following advantages can be realized:

1. It becomes difficult if not impossible for a non-authorized Service Provider to 'piggy back' on the pseudonymous PLDs 112 that another legitimate Service Provider has deployed at significant cost.

2. Generally more user/consumer privacy is allowed as non-authorized applications cannot know the location of the mobile device from PLD broadcasts.

3. The PLD's authenticity can also be established, which leads to proof-of-presence use-cases for the PLD when the application can prove that the user is actually in the presence of the PLD (e.g., replay attacks are essentially thwarted).

Figure 4:
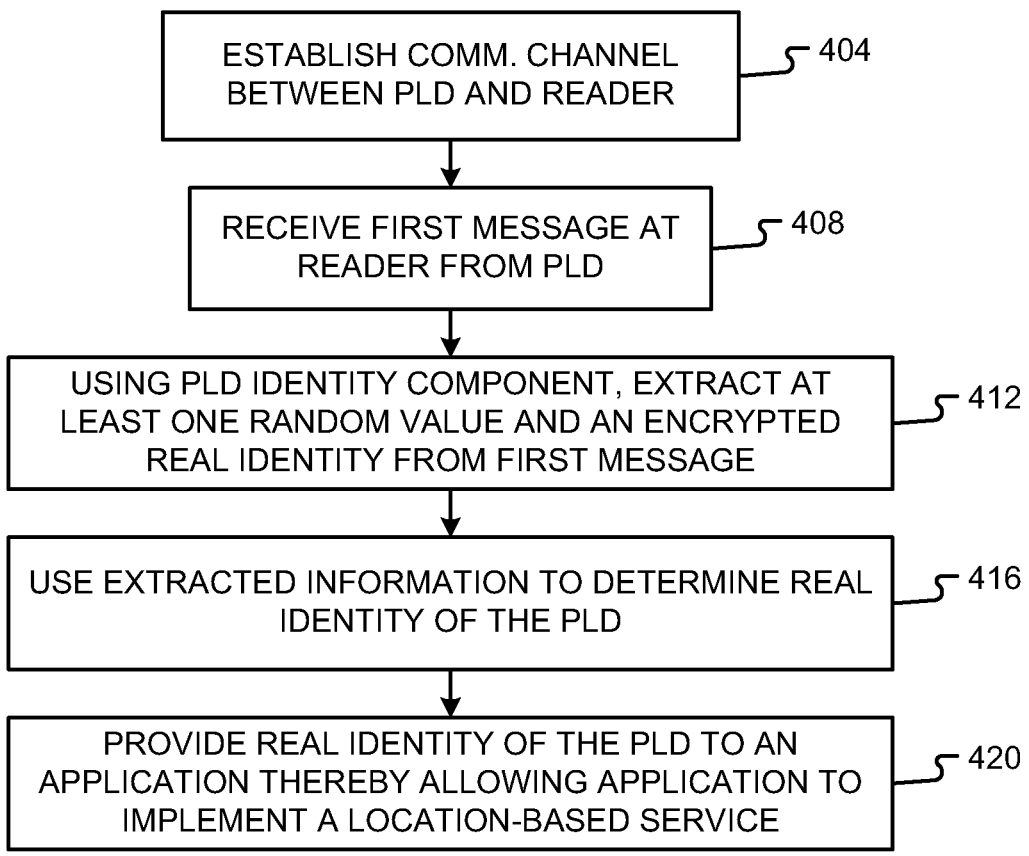
FIG. 4 is a flow diagram depicting a method of obtaining and using real identity information in accordance with at least some embodiments of the present disclosure.

With reference now to FIG. 4, a method of obtaining and using real identity information will be described in accordance with at least some embodiments of the present disclosure. The method begins when a communication channel 116 is established between a PLD 112 and a reader 108 (step 404). The communication channel 116 can be a contactless or contact-based communication channel without departing from the scope of the present disclosure. In some embodiments, the communication channel 116 is established at least in part by virtue of the PLD 112 being placed within a read range of the reader 108.

The method continues with the PLD 112 generating at least one message that is transmitted to the reader 108 via the communication channel 116 (step 408). The formatting of the message may depend upon the protocol of the communication channel 116. For instance, if the communication channel 116 corresponds to a WiFi channel, then communication packets formatted according to 802.11N standards may be utilized. As another example, if the communication channel 116 corresponds to an NFC channel, then one or more messages formatted according to NDEF formatting standards may be utilized.

Regardless of the protocol used to exchange messages between the PLD 112 and the reader 108, when the reader receives the message(s) from the PLD 112, the reader 108 may utilize the PIC 304 to extract at least one random value from the message and an encrypted version of the real identity from the message (if such a scenario is being utilized) (step 412). The PIC 304 may be deployed locally at the application 212 of the reader 108 or the reader 108 may leverage a remotely-located PIC 304 (e.g., a PIC 304 of a trusted service).

The PIC 304 utilizes the extracted information (e.g., location and/or anonymized identity information) to determine a real identity of the PLD 112 (assuming the PLD 112 corresponds to an authentic/genuine PLD 112 programmed to operate according to the defined identity-retrieval scenario being deployed) (step 416). This identity information can then be bound to the location information also obtained from the PLD 112 at the tracking application 128 to update its location report(s) based on the most recent interaction event between the PLD 112 and the reader 108 (step 420). This updating further allows the tracking application 128 to determine a current location of the identified PLD 112, update its location report, and possibly communicate some or all of that location information (e.g., location report) to a customer device/network 132. In some embodiments, the customer at the customer device/network 132 can use the real identity information and/or location information provided by the tracking application 128 to implement a location-based service or set of services (consistent with preferences of the customer and/or holder of the reader 108).

Figure 5:
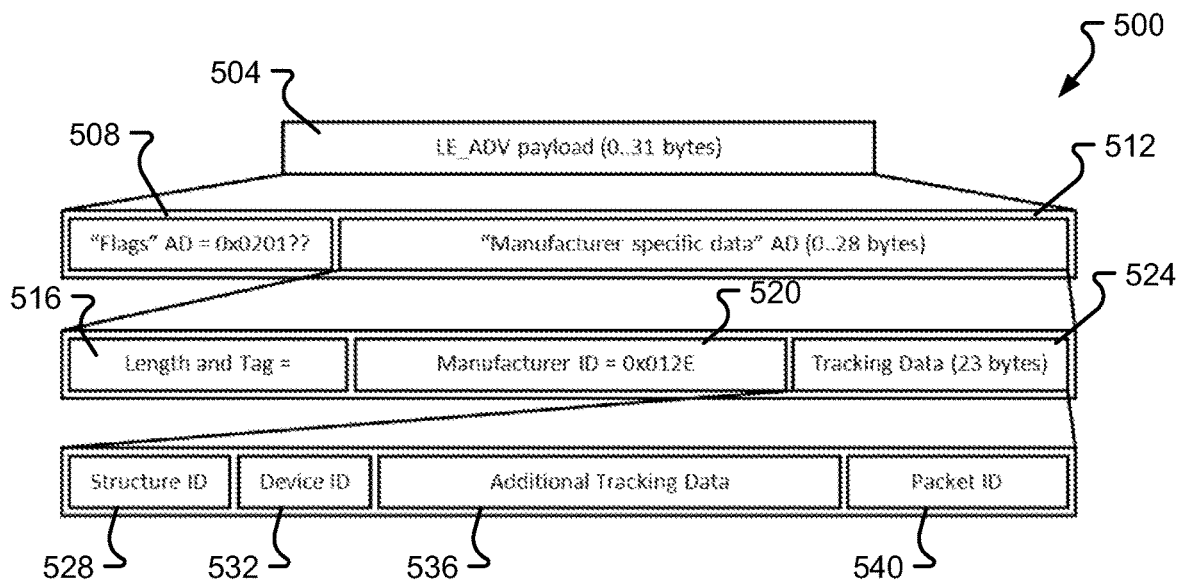
FIG. 5 is a block diagram depicting a first data structure that can be used in accordance with at least some embodiments of the present disclosure.
Figure 6:
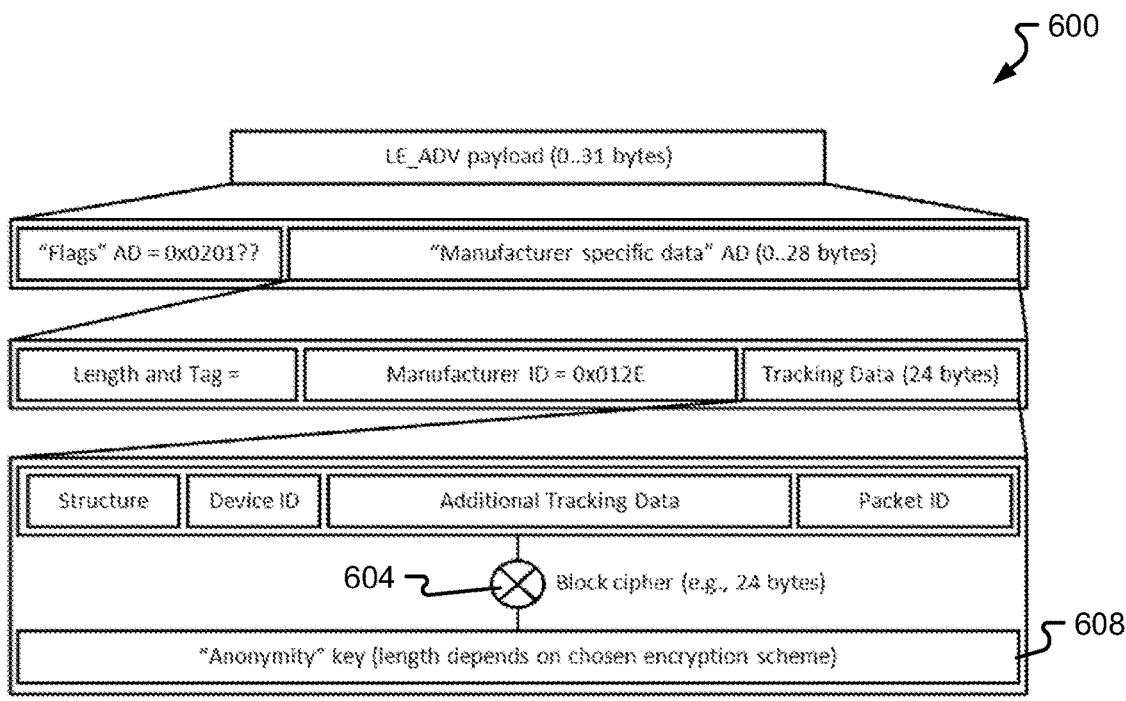
FIG. 6. is a block diagram depicting a second data structure that can be used in accordance with at least some embodiments of the present disclosure.

With reference now to FIGS. 5 and 6, two data structures 500, 600 that can be used to deliver information from a PLD 112 to a reader 108 will be described in accordance with at least some embodiments of the present disclosure. Although FIGS. 5 and 6 depict certain fields contained within the data structures 500, 600 and a particular organization of those fields, it should be appreciated that the data structures 500, 600 depicted and described herein are illustrative and are not intended to limit the scope of the present disclosure. Indeed, any message format and data structure usable with that message format can be used to deliver some, all, or similar types of data between a PLD 112 and a reader 108 (or between a reader 108 and server 120). Furthermore, the sizes of the various fields are for illustrative purposes and should not be construed as limiting the scope of the present disclosure.

With reference initially to FIG. 5, a first data structure 500 is shown to include a payload 504 having one or more flags 508 and manufacturer specific data 512. The manufacturer specific data 512 can be further partitioned to include a length and tag field 516, a manufacturer identification field 520, and a tracking data field 524. The tracking data field 524 may further contain a structure identifier 528, a device identifier 532, additional tracking data 536, and a packet identifier 540.

This data structure 500, in some embodiments, offers better tracking capabilities than static iBeacon structures because it is capable of changing dynamically with every broadcast event. In addition, it may also provide space for additional data which can be used by the tracking application 128 to report tracking events of different types. The data structure 500 does not require any specific computing power on the PLD 112 but, as consequence, it may not be secured against unwanted tracking or re-play attacks.

In some embodiments, the data structure 500 can be used to maintain full interoperability with Bluetooth Smart specifications thereby allowing a wide range of supported devices (e.g., PLDs 112). Therefore, an applicative data space within Bluetooth Smart advertising packets can be used and a proprietary data structure 500 can be defined on top of the advertising element as defined in Bluetooth Smart Generally Accepted Practices (GAP). This provides a theoretical space of 31 (payload 504 of advertising packet)–3 ("Flags" AD element 508 which is mandatory for Bluetooth Smart advertisement)–2 (AD element tag and length 516)–2 (manufacturer ID 512)=24 bytes. To accommodate an anonymity requirement, any common symmetric cryptography schemes can be used and one more bytes of the data structure 500 can be reserved for anonymized structure 500.

In some embodiments, most of the fields of the data structure 500 may be formatted according to a predetermined standard (e.g., Bluetooth). However, the tracking data field 524 may be specifically formatted to preserve anonymity within the communication system 100. In some embodiments, the structure identification field 528 may correspond to a field of a particular size (e.g., 6 bits) that provides space of 64 values which can clearly identify coding of the additional tracking data field 536. In some embodiments, only one value may be defined as "100000" (=0x80) which corresponds to a random value (e.g., ="Additional Tracking Data" field 536 should be ignored on the side of broadcast receiver/reader 108). All other values (ranges "000000" to "011111" and "100001" to "111111") may be reserved for future use.

The device identification field 532 may correspond to a field of a predetermined size (e.g., 18 bits). The full range of the field 532 (e.g., 0 to 262,143) can be used for storing a unique tracking device identifier, which may correspond to particular field in tracking report generated by the tracking application 128. To maintain compatibility with static iBeacon systems, some embodiments of the present disclosure may allocate the range 0 to 65,535 for these purposes. To further support tracking event type A, there may be an option to assign another part of this range for tracking nodes 136. However, some embodiments could be agnostic to broadcasting from tracking nodes 136 and PLDs 112 so this is rather a suggestion than an ultimate rule.

The additional tracking data field 536 may correspond to a data field of a predetermined length (e.g., 15 bytes) that is reserved for future use (e.g., typically to facilitate data tracking from tracking events of type A or C). Until such use, the additional tracking data 536 may be used to store random data (e.g., corresponds to "Structure ID" field value "100000") meaning that the PLD 112 broadcasting device should generate random data (e.g., to allow better identification of the same broadcasts received by multiple reader 108) but in fact it can use any static value (such as 0x00..00) because this field is not interpreted by the backend location application 128.

The packet identification field 540 may correspond to a data field of a predetermined length (e.g., 5 bytes) that is used to store information that identifies packets transmitted from a PLD 112 to a reader 108. In some embodiments, the values contained in the packet identification field 540 differ for each broadcasted packet during a life-time of PLD 112 in the system 100. The data contained in the field 540 could be either a simple sequence counter or a timestamp (e.g., in case that PLD 112 has autonomous RTC synchronized with the rest of tracking backend).

With reference now to FIG. 6, additional details of a data structure 600 which is similar to data structure 500, but with use of a block cipher 604 and anonymity key 608 will be described in accordance with at least some embodiments of the present disclosure. The anonymization mechanism described herein (e.g., cipher 604 and key 608) is just extending properties of the data structure 500. The anonymization mechanism described herein is based on a simple requirement that each broadcast from a particular PLD 112 should be different and there should be no visible pattern which could link any of them together (e.g., they look completely "random"). This ultimately requires a randomization of a Bluetooth Smart Advertising Address (e.g., MAC) which is used in ADV_IND packets. This is very low level parameter of Bluetooth Smart stack and it can be challenging to randomize this value on a target device. If it is not achieved (or it is done just partially—e.g. MAC address is changed every X hours) it significantly lowers the anonymization effect at the application layer.

The anonymization may be applied over the whole tracking data field 524 or a portion of the tracking data field 524 (e.g., less than all of the tracking data field 524, such as not encrypting the packet identification field). It may also be possible to apply two (or more) different ciphering/encryption methods to different portions of the tracking data field 524. For example, one portion of the tracking data field 524 may have a first cipher/key applied thereto whereas a second portion of the tracking data field 524 may have a second cipher/key applied thereto. To be able to identify the anonymized tracking data field 524 from any other data contained inside manufacturer specific data field 512, a length (e.g., 24 bytes) may be reserved for anonymized tracking data 524. If any other application wants to use this element with this length it can cause collisions and may not be compatible with the tracking solution described herein.

The ciphering scheme 604 used may depend upon the capabilities of the PLD 112 and/or reader 108. In particular, the performance should match timing and power efficiency criteria or there might be a lack of hardware acceleration. In some embodiments, a 3DES-CBC scheme 604 (e.g., 112-bit or 168-bit key 608) can be used. In some embodiments, AES FFX may be used as the cipher 604 with one or multiple 128 bit-keys 608.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

What is claimed is:

1. A pseudonymous proximity location device, comprising:
    a communication interface that enables communications with a reading device via a communication channel;
    a microprocessor; and
    computer memory including the following stored thereon:
    a real identifier that is substantially uniquely associated with the pseudonymous proximity location device; and
    microprocessor-executable instructions configured to:
        encrypt the real identifier with a symmetric key;
        concatenate a nonce value after encrypting the real identifier where the nonce value is associated with the encrypted real identifier; and
        generate a message that is transmitted via the communication interface to the reading device, the message comprising a transmitted identifier that reveals the real identifier to an authorized reading device while simultaneously concealing the real identifier from a non-authorized reading device, wherein the message includes the encrypted real identifier and the concatenated nonce value associated with the encrypted real identifier.

2. The pseudonymous proximity location device of claim 1, wherein the nonce value is a first nonce value that is unique to the message.

3. The pseudonymous proximity location device of claim 2, wherein the computer memory further comprises a nonce log that contains a plurality of nonce values previously generated by the microprocessor, wherein the instructions are further configured to receive a first response from the reading device and compare a nonce value contained within the first response with at least some of the nonce values contained in the nonce log to determine if the reading device corresponds to an authorized reading device and, if the nonce value contained within the first response is found in the nonce log, the instructions are further configured to generate a second message that is transmitted via the communication interface to the reading device, wherein the second message contains the real identifier and wherein the first message does not contain the real identifier.

4. The pseudonymous proximity location device of claim 3, wherein the real identifier contained within the second message is encrypted using the first nonce value.

5. The pseudonymous proximity location device of claim 1, wherein the first message comprises a temporary access ticket that enables the mobile device to prove it is authorized and in communication with a trusted entity.

6. The pseudonymous proximity location device of claim 1, wherein the transmitted identifier comprises the real identifier that is encrypted with a public part of an ephemeral public/private keypair.

7. The pseudonymous proximity location device of claim 1, wherein the communication interface comprises a wireless interface.

8. The pseudonymous proximity location device of claim 1, wherein the first message is transmitted via the communication interface via at least one of a Near-Field Communications (NFC) protocol and a Bluetooth protocol.

9. A reading device, comprising:
    memory; and
    an application associated with the memory, the application configured to:
        receive an identifier including a nonce from a proximity location device in connection with providing one or more services to a user of the reading device;
        create a response based on the nonce, a hash-based message authentication code, and an encryption key;
        forward the response to the proximity location device;
        receive a pseudo anonymous response from the proximity location device based on the response forwarded from the reading device; and
        access a Proximity Location Device (PLD) Identity Component (PIC) to determine a real identity of the proximity location device based on the pseudo anonymous response received from the proximity location device, wherein the pseudo anonymous response does not expose the real identity to applications which do not have access to the PIC.

10. The reading device of claim 9, wherein the PIC contains a function to retrieve the real identity from the pseudo anonymous response.

11. The reading device of claim 9, wherein the PIC is resident on the reading device.

12. The reading device of claim 9, wherein the application accesses the PIC via an Internet connection.

13. The reading device of claim 9, wherein the PIC computes the real identity cryptographically from information contained in the pseudo anonymous response.

* * * * *